United States Patent [19]
Greenia

[11] 3,903,844
[45] Sept. 9, 1975

[54] AQUARIUM EQUIPMENT

[76] Inventor: Maurice J. Greenia, 202 Piper, Detroit, Mich. 48215

[22] Filed: Aug. 15, 1973

[21] Appl. No.: 388,457

[52] U.S. Cl. .................................. 119/5; 119/5 X
[51] Int. Cl.² .................................................. A01K 63/00
[58] Field of Search .......... 119/5.3; 210/169; 61/21; 138/114

[56] References Cited
UNITED STATES PATENTS

| | | | |
|---|---|---|---|
| 192,595 | 7/1877 | Palen et al. | 119/5 X |
| 1,576,462 | 3/1926 | Polzin | 119/5 |
| 2,665,250 | 1/1954 | Willinger et al. | 119/5 X |
| 2,674,574 | 4/1954 | Pettas | 119/5 X |
| 3,110,754 | 11/1963 | Witort et al. | 138/114 X |
| 3,143,861 | 8/1964 | Dumas | 138/114 X |
| 3,255,731 | 6/1966 | Girard | 119/5 X |
| 3,696,789 | 10/1972 | Richard | 119/5 |

FOREIGN PATENTS OR APPLICATIONS 934,853   11/1955   Germany .............................. 119/5

Primary Examiner—J. N. Eskovitz
Attorney, Agent, or Firm—Whittemore, Hulbert & Belknap

[57] ABSTRACT

Aquarium equipment comprising at least two open-top tanks having transparent side wall portions, and a cross-over tube of any desired cross-sectional shape, having each of its lower ends open and disposed beneath the level of water in one of the tanks. The cross-over tube is filled with water, operates as a siphon to maintain the water in the tanks at equal levels, and provides an interconnecting passage through which fish may swim from one tank to another.

7 Claims, 13 Drawing Figures

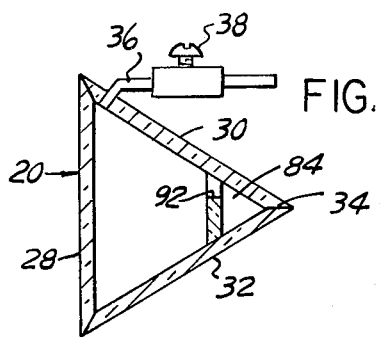
FIG. 4
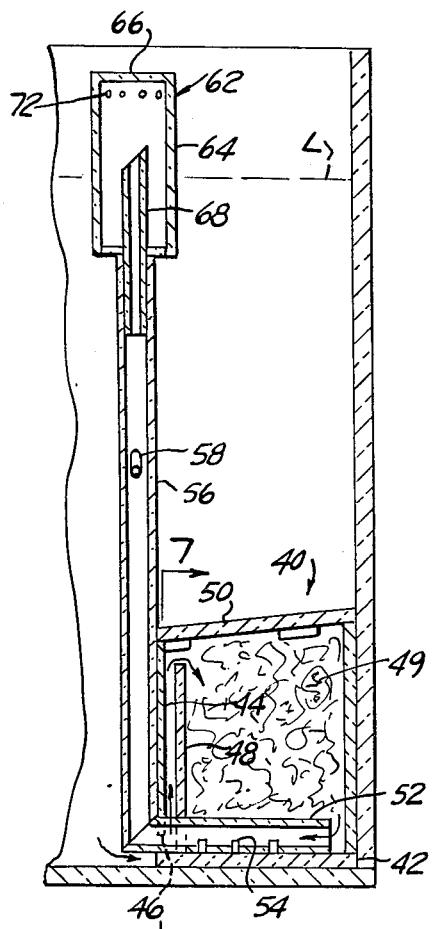
FIG. 3
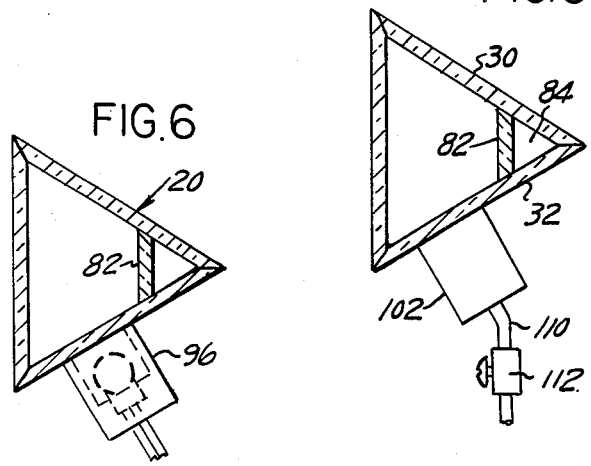
FIG. 5
FIG. 6
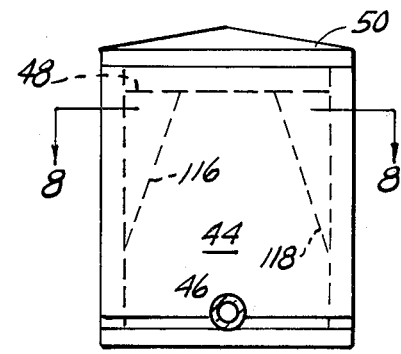
FIG. 7
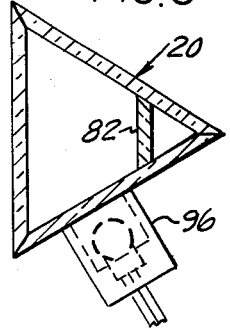
FIG. 10
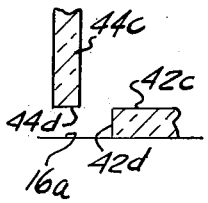
FIG. 9
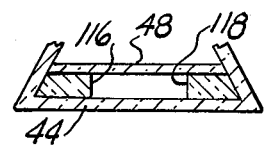
FIG. 8
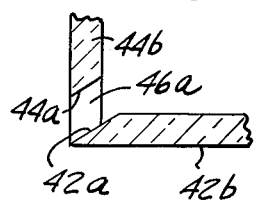
FIG. 13

AQUARIUM EQUIPMENT

BRIEF SUMMARY OF THE INVENTION

The aquarium system comprises at least two tanks which are open at the top and have at least transparent side portions. Preferably, the tanks are of prismatic shape having side walls formed of flat sheets or panels of transparent material, preferably a clear plastic. Preferably, the edges of the transparent sheets are beveled and are secured together in sealed relation by suitable adhesive means.

While the tanks may take different shapes, it is preferred to provide them in triangular shape in horizontal section and excellent results are obtained when the panels are of equal width so that an equilateral triangle appears in horizontal cross-section. This construction is of a pleasing appearance, tends to refract visible spectrum colors under many common lighting conditions, strongly resists shape distortion that could cause leaking or breakage of conventional aquariums, and permits any of the three sides to give an equally effective wide-angle view of the entire interior.

Interconnecting the two tanks is a cross-over tube having an opening therethrough of sufficient size to permit fish to cross readily through the tube from one tank to another. In its simplest form, with two tanks, this tube has the general or functional shape of an inverted U with the downwardly extending legs of the tube open at the ends. In use, the cross-over tube is supported by the tanks by suitable means and is filled with water. In this condition it acts as a siphon and operates to maintain the same water level in both tanks, a matter of considerable importance as will later appear. One or more of the tanks is provided with a filter through which all water in the tanks and cross-over tube is continuously circulated to remove contaminants and to maintain aeration. As will later appear, these filters are specially formed for cooperation with the particular tanks, and to provide maximum effective removal of contaminants.

Means are provided for insuring a flow of water through the cross-over tube and this means takes the form of an air-driven pump (which may conveniently be of the same type as employed to produce flow through the filtering units) so that water is drawn from one tank and into the other, from which it flows back to the first tank through the cross-over tube.

Special means are provided effective to insure that if the water is lost from the siphon formed by the cross-over tube, the smaller siphon through which water is pumped from one tank to another also becomes automatically inoperative, thus avoiding the possibility of overflowing the tank into which the water is drawn.

A single air pump may be provided with connections for the two or more air-driven water pumps referred to, and conveniently, the air pump may be supported at the rear side of an intermediate portion of the cross-over tube.

An added feature is the provision of illuminating means provided at the rear side of the cross-over tube and particularly, with means to direct light from the illuminating device longitudinally of the tube toward the separate tanks.

The filter units may have their shape arranged to conform to the shape of the particular tanks. Thus, in the preferred form of tank, in which the tank is of triangular horizontal cross-section, the filter unit may also be of a similar triangular cross-section and hence, may be conveniently received at the apex of the triangle opposite the side of the tank normally presented for view.

As an added feature, particularly where the tank is of triangular cross-section, one or both of the rear panels opposite to the panel through which the fish are normally viewed, and the bottom of the tank if it is not covered by the conventional layer of gravel, normally will appear to the eye as a mirror surface, thus creating a view that appears to multiply the amount of space, number of fish, and other visible things in the tank.

BRIEF DESCRIPTION OF THE DRAWINGS

FIG. 3 is a fragmentary vertical section on the line 3—3, FIG. 1.

FIGS. 4, 5 and 6 are enlarged sectional views on the lines 4—4, 5—5, and 6—6, respectively, of FIG. 1.

FIG. 7 is a somewhat enlarged elevational view looking in the direction of the arrow 7—7, FIG. 3.

FIG. 8 is a fragmentary sectional view on the line 8—8, FIG. 7.

FIGS. 9 and 10 are enlarged fragmentary sectional views showing modifications of the filter inlet.

FIG. 13 is a three-tank system, with a three-legged cross-over tube, as one of the many possible multiple tank adaptations of this aquarium equipment system.

DETAILED DESCRIPTION

Figure 1:
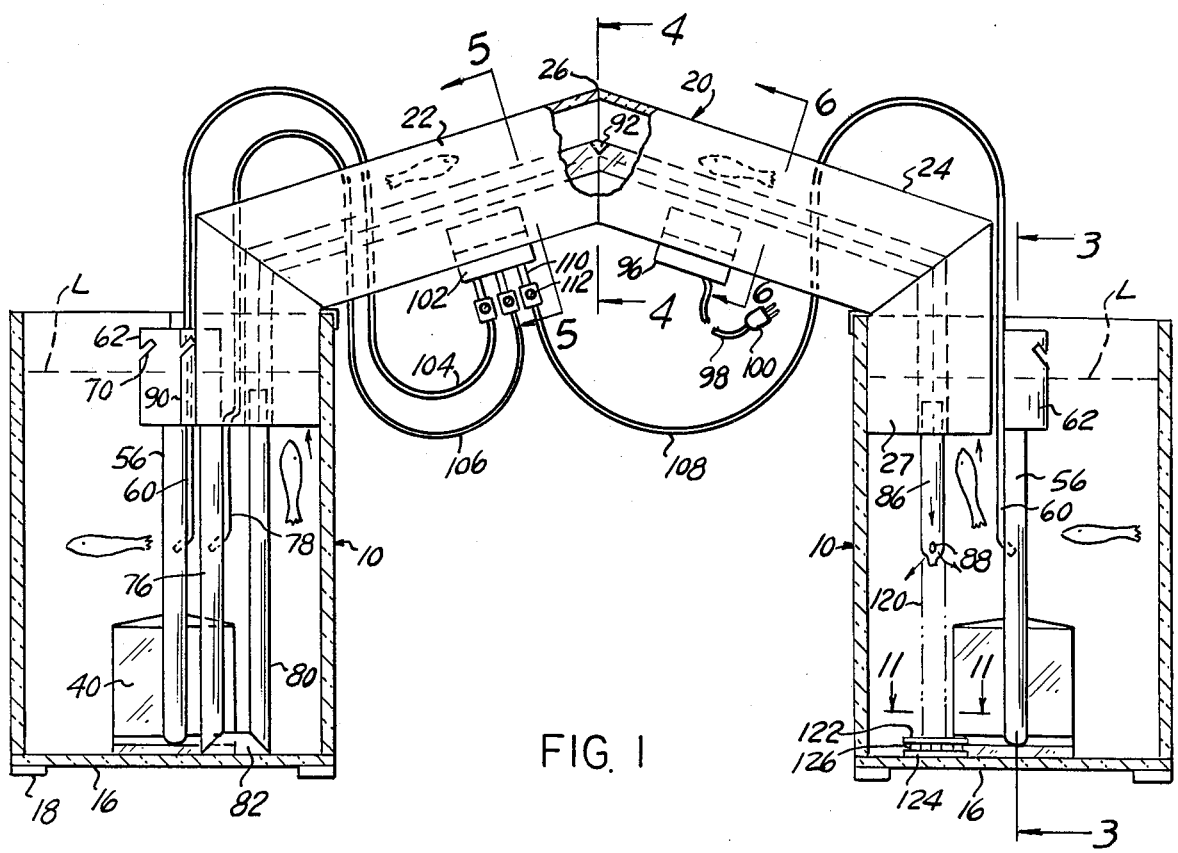
FIG. 1 is an elevation view showing a two-tank arrangement of aquarium equipment, with parts in section.
Figure 2:
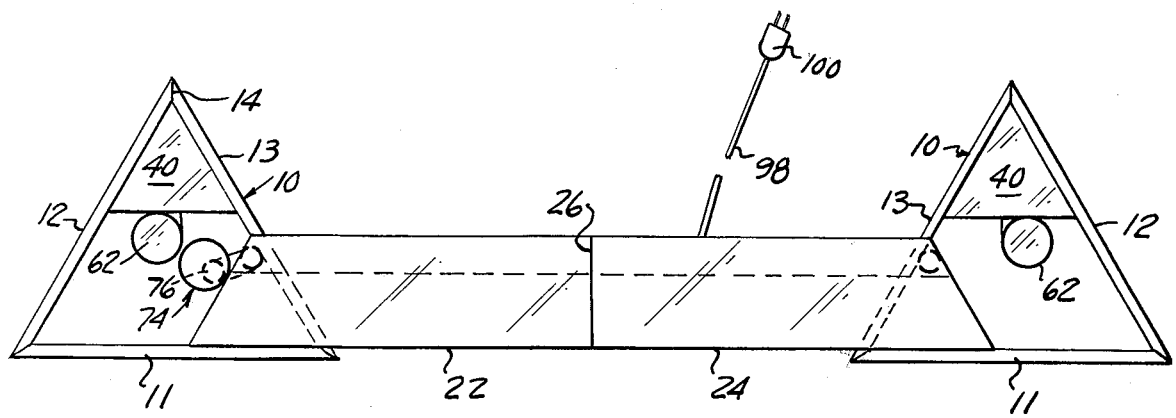
FIG. 2 is a plan view of the equipment illustrated in FIG. 1.

While in its broadest aspect, the tanks may be of any shape, including cylindrical, the preferably design of tanks is such that they are prismatic and preferably of triangular cross-section as illustrated at 10 in FIG. 2. As herein illustrated the flat front panel is designated 11 and the rearwardly extending side panels are designated 12 and 13. Conveniently, the flat panels or sides of the tank, as well as the bottom, are formed of clear transparent plastic material, and the plastic sold under the trade names "PLEXIGLAS" and "LEXAN," have proven to be completely satisfactory. Preferably, the tanks are formed by beveling the edges of the sheets or panels as indicated at 14, and these surfaces are adhesively united by avialable adhesives which produce secure sealed connections. As best indicated in FIG. 1, the bottom walls 16 of the preferred tanks are supported on three plastic blocks 18, providing the tripod characteristic stability of 3-point contact.

In FIG. 1 the water level within the tanks is indicated at L and the level in both tanks is maintained equal by virtue of a siphon or cross-over tube 20. The tube 20 is formed of transparent material, and while it may be of any shape it is preferably formed of flat sheets or strips of clear transparent plastic such for example as the same plastic employed in fabricating the tanks 10. While the exact shape of the cross-over tube may be widely varied, as illustrated it comprises two upwardly inclined legs 22 and 24 which are adhesively joined together as indicated at 26. The legs 22 and 24 are respectively connected to downwardly extending tubular portions 27, the lower ends of which extend below the water level L.

As best seen in FIG. 4, the cross-over tube 20 comprises a flat vertical front wall 28 and two rear wall portions 30 and 32 which are inclined as illustrated and which join at the adhesively united bevel surfaces 34. The vertical plates or strips 28 are similarly adhesively united to strips 30 and 32.

The simplest means of filling the cross-over tube 20 with water, is to withdraw the air through tubing that leads from the highest point of the cross-over, when it is already in position connecting its water-filled tanks. Suction to withdraw the air can be applied with no more effort than using a soda straw, for the relatively small cross-over tubes most aquarium users would employ. For small cross-over tubes, the air withdrawal tube can be inserted when it must be used, then withdrawn, out of the way. For a cross-over tube several feet in height and/or length, the air withdrawal tube can be built-in, such as tube 36 equipped with valve 38 in FIG. 4.

With water-filled cross-over and tanks fish may swim freely from one tank to the other through the cross-over tube. It has been found that the fish may be trained to swim from one tank to another by alternate feeding, or similar conditioned-response behaviour modification.

One or both of the tanks is provided with a filter 40 best illustrated in FIG. 3. While the shape of this filter may be as desired, it is preferably to conform it to the shape of the tank, and as best seen in FIG. 2, the filter 40 may be of triangular cross-section and disposed within the acute inner corner of the tank opposite the transparent front panel 11. The filter comprises a bottom wall 42, a front wall 44 the bottom edge of which is spaced slightly above the bottom wall 42 as indicated at 46 to form an elongated slit inlet adjacent the bottom wall of the tank which facilitates keeping the bottom of the tank clean. The front wall 44 of the filter unit is adhesively connected to the side walls to provide the triangular shape which permits the unit to fit within the tank as illustrated in FIG. 2

Located within the enclosure defined between the front wall 44 and the side walls is a partition 48 which extends from the bottom wall upwardly and is adhesively connected at its side edges to the side walls of the filter unit. The upper edge of the partition 48 is spaced below a removable top 50 which is provided on the filter unit. The space between the partition 48 and the side wall constitutes a filter component 49 in which suitable filtering material of known type is provided. Extending through an opening in the partition 48 into the interior of the filter is an outlet tube 52 open at its end as illustrated and further provided with openings 54 providing inlet. The outlet tube 52 is suitably connected to a vertically extending pump tube 56 having an inlet port at 58 for the connection of an air inlet tube 60 as indicated in FIG. 1.

The pump tube 56 is of known type and depends for its operation upon a supply of air being admitted through the port 58. The level of water in the tube extends above this air inlet port and the air bubbles rising in the tube carry the water upwardly and are effective to discharge them out of the upper end of the tube. If desired, suitable means such as an air stone of known type may be provided which causes the air bubbles to break up into finely divided form, thus improving the pumping action and also enhancing aeration of the water in the tanks.

Preferably, in order to avoid noise and possible splashing where the pumping action is vigorous, a splash and noise guard 62 is provided. As best seen in FIG. 3, this comprises an inverted cup having a tubular portion 64 of any desired cross-sectional shape, and a top closure 66 and being open at its bottom. This cup is suitably secured to a coupling tube 68 as by adhesion, and the guard may be mounted at the upper end of the pump tube 56 by inserting the lower end of the tube 68 into the upper open end of the pump tube 56. The lower end of the guard 62 is positioned beneath the water level L and is open, permitting the water pumped upwardly through the tube to return to the tank. Preferably, an inclined slot indicated at 70 is provided and/or a series of small openings 72 may be formed into the upper portion of the tubular element 64 for escape of air and to direct water downwardly toward the water in the tank.

Conveniently, tops of the vertical side walls of the filter unit are inclined so that the cover 50 slopes as illustrated in FIG. 3 to prevent deposits collecting on the upper surface of the removable top or cover.

It will be understood that when air is introduced into the pump tube 56 the air bubbles upwardly through the tube carrying water with it for drawing water into the vertical pump tube 56 through the inlet tube 52 located at the bottom of the filter compartment 49. The water from the filter compartment is replaced by water entering the elongated inlet slot 46. Since this slot extends horizontally close to the bottom, it tends to carry any sediment or other deposits on the floor of the tank into the filter compartment where it is removed by the filter material.

In order to insure that the water in the cross-over tube 20 is aerated and filtered, means are provided for withdrawing water from one tank and discharging it into the other. This means comprises a pump indicated generally at 74 and comprising an upwardly extending pump tube 76 having an air inlet tube 78 connected to an intermediate portion thereof. The pump tube 76 is connected to a vertical tube 80 by an tubular connection 82 and the tube 80 in turn connects to means defining a substantially closed passageway extending to the other tank, or the right hand tank as seen in FIG. 1. Preferably, the means providing the passage connecting the pump tube 76 and the vertical tube 80 to the right hand tank 10 comprises elongated strips located within the cross-over tube as is best apparent from an inspection of FIGS. 4–6. In these Figures the cross-over tube is seen to include the partition 82 which is beveled at its edges and adhesively secured to the wall portions 30, 32 to define a closed passage 85. At the end of the cross-over tube portion 27, there is preferably provided an inlet tube 86 having inlet ports 88 which prevent small fish being drawn into the tube 86 and the passage 84.

When air is introduced through the air supply tube 78 into the intermediate portions of the pump tube 76, water is pumped upwardly through the tube and may be discharged through a splash guard and noise inhibitor 90 which may be identical with the guard 62 previously described. This draws water through the tubular connections 82 and 80, through the continuous substantially closed passage 84, and through the tube 86. To the extent that this flow of water tends to raise the level in the left hand tank as seen in FIG. 1, the siphon action of the cross-over tube 20 will cause a reverse flow through the cross-over tube proper, thus insuring that the water in the cross-over tube remains in suitably filtered and aerated condition. Since the foregoing arrangement provides for filtration of water and the transfer of water from tank to tank, it will be seen that a single filter unit may be employed if desired. However, with the foregoing arrangement, it is preferred to provide a separate filter unit in each of the tanks.

It will be observed that if for any reason, such for example as a leak occurring in the cross-over tube 20, the cross-over tube should lose the water contained therein, the water in the cross-over tube would flow back into the tanks 10 and accordingly, the water in the tanks should at all times be retained at a level to permit such return flow in the event of a leak developing in the cross-over tube. However, another possibility must be guarded against and that is the transfer of water from one tank to the other by the action of the transfer pump 74 which may continue operation even though the cross-over tube has lost its water content. This can be prevented by providing a very small opening, as indicated at 92, providing communication between the return passage 84 in the cross-over tube and the interior of the cross-over tube proper. This opening is of a size such that while the cross-over tube remains filled with water, and while the pump 74 is in operation, an effective flow of water through the passage 84 will be maintained even though some water may pass from the cross-over tube into the return passage 84. If however, the cross-over tube loses its water, the passage 92, while of a size sufficient to limit an undesirably large flow of water, will nevertheless be sufficiently large to permit a flow of air into the passage 84 so as to stop the pumping action and prevent continued transfer of water from the right hand tank to the left hand tank.

Referring now to FIG. 1, perferably illuminating means indicated generally at 96 are provided connected through a cord 98 to a conventional plug 100. The illuminating means includes reflecting means (not shown) adapted to direct some of the light longitudinally of the cross-over tube where, st least partly as a result of internal reflection, the light will be directed into the tanks 10. Conveniently a single air pump indicated at 102 is provided which may be connected by flexible tubes 104, 106 and 108 to the various water pumps. In this relationship the air pump, which may be of conventional design, is at least partly if not entirely concealed behind the crossover tube. Preferably, a pump is provided with a multiplicity of outlet tubes 110 each of which has associated therewith an adjustable closure 112 so that the flow of air to the several pumps may be controlled as desired.

Referring now to FIGS. 7 and 8 there is illustrated a modification of the filter in which the space between the front wall 44 of the filter and the partition 48 contains triangular blocks 116 and 118 defining a passageway therebetween which is of decreasing cross-section and which accordingly increases the velocity of water drawn into the filter unit 42 by the action of the pump tube 56. This has the advantage of more completely carrying solid materials picked up by flow through the entrance slit 46, up and over the top edge of the partition 48.

In FIG. 9 there is illustrated a modification in which the elongated horizontal inlet port is designated at 46a and is provided between the lower beveled edge 44a of the front plate 44b and the correspondingly beveled edge 42a of the bottom plate 42b. With this arrangement the inlet port 46a is located directly at the bottom surface of tank and hence, is most effective to insure that flow of water keeps the bottom of the tank clean.

In FIG. 10 there is shown a further modification of the means defining the inlet into the filter. Here, the front wall is formed by plate 44c, the lower edge 44d of which terminates above the surface 16a, which is the upper surface of the bottom plate 16 of the tank. Bottom wall 42c of the filter has a front edge 42d terminating short of the inner surface of plate 44c. There is thus defined an inlet in which the floor of the tank actually constitutes a portion thereof, and tends to keep the floor clear of deposits.

Figures 11, 12:
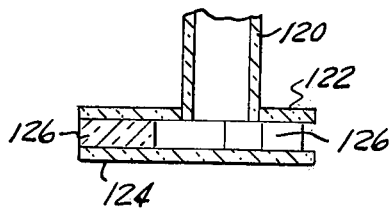
FIG. 11 is an enlarged sectional view on the line 11—11, FIG. 1.
FIG. 12 is a sectional view on the line 12—12, FIG. 11.

A further modification of the invention is illustrated in FIGS. 1, 11 and 12. Instead of terminating in an inlet tube, as illustrated in full lines 86 in FIG. 1, the tube may be continued downwardly as indicated in dot and dash lines 120 to an intake foot located at the bottom of the tube 120 and resting on the bottom wall 16 of the tank. The foot comprises two vertically spaced plates, an upper plate 122 and a bottom plate 124. The upper plate 122, as best seen in FIG. 11, has an opening therethrough for connection to the tube 120, and the plates 122 and 124 are spaced apart by narrow blocks 126. This provides narrow elongated horizontal inlet ports at the outer edges of the plates 122 and 124 which are located in proximity to the bottom wall 16 and hence, assist in preventing build-up of deposits on the bottom wall, and can eliminate need of an additional filter in any tank equipped with this intake foot.

If desired, in order to bring the narrow elongated horizontal inlet ports into closer cooperation with the bottom surface of the tanks, the edges of the bottom plate may be beveled inwardly so as to provide openings which extend completely to the bottom wall. This same detail of construction may of course be applied to the filter 40 illustrated in FIG. 3.

Referring now to FIG. 13 there is illustrated a modified construction in which three tanks 130, 132 and 134, each of which is of triangular horizontal cross-section are positioned as indicated so that the three tanks together occupy a triangular space. A cross-over tube system is provided comprising the three tubes 136, 138 and 140 each of which includes an open ended downwardly extending portion located beneath the water level in the associated tanks. The upper ends of the tubes at the zone indicated generally at 142, are interconnected so as to provide continuous passageways or cross-over connections for fish to swim from any one of the three tanks into any other. A filter is indicated at 144 in tank 134.

While in FIG. 1 for example, the connections between the tubes 76 and 80 are shown as a short tube connected at right angles with respect thereto, it is usually preferred to provide a smooth circular bend so as to avoid the sharp corners and prevent deposit of solid material which might otherwise occur.

Reference was previously made to the possibility of providing mirror-like reflecting surfaces on the flat plates at the rear of the tanks and possibly at the rear of the cross-over tube. In many cases this is unnecessary since the indicies of refraction and the angles of reflection are such that mirror images are provided without the provision of special means.

What I claim as my invention is:

1. Aquarium equipment comprising a pair of open topped tanks having transparent sides, an inverted generally U-shaped cross-over sealed siphon tube transparent on at least one side and having open ends extending below the normal water level in said tanks and dimensioned to permit fish to swim through said cross-over tube from one tank to the other, separate passage means within said cross-over tube connecting said tanks, and a pump located in one tank and connected to said passage means to transfer water from one tank to the other for return to said one tank by siphon action.

2. Equipment as defined in claim 1 in which said pump is connected to said passage means to draw water from the other tank into the tank in which said pump is located.

3. Equipment as defined in claim 2, said passage means having a small port connecting it adjacent the high point of said passage means and cross-over tube effective to permit air to flow into the passage means if the cross-over tube loses its water so as to permit water to flow from the passage means into both tanks to prevent continued transfer of water from one tank to the other by said pump and passage means.

4. Equipment as defined in claim 1 in which said cross-over tube is triangular in transverse cross-section and in which said passage means is constituted in part by an elongated wall member extending within said cross-over tube across an internal corner thereof.

5. Cross-over bridge structure adapted to interconnect two aquaruim tanks, said bridge structure comprising a horizontally extending intermediate tubular portion adapted to span the space between two tanks above the level of the tops of the tanks, and a depending open-ended tubular end portion at each end of said intermediate portion adapted to extend into the tanks and below the surface of the water in said tanks, said tubular portions being impervious to leakage so as to be retained full of water by a siphon action and dimensioned to provide a passage for fish to swim from one tank to the other, said tubular portions including transparent wall portions to make fish swimming through the bridge visible to spectators, a conduit extending longitudinally of the tubular portions and having one end open and adapted to extend below the surface of water in one of the tanks, the other end of said conduit being adapted to be located in the other tank, and pump means connected to said conduit to provide for a flow of water between the tanks for which said bridge structure is designed.

6. Bridge structure as defined in claim 5, said conduit having a small opening at its point of maximum elevation communicating with the interior of the passage provided by the tubular intermediate portion of said brige structure.

7. Bridge structure as defined in claim 5, in which said tubular portions have adjacent flat side wall portions and in which said conduit is formed by a continous partition interconnecting said two adjacent flat side wall portions adjacent the interior corner formed by said side wall portions.

* * * * *